(12) United States Patent
Ogata et al.

(10) Patent No.: US 7,591,976 B2
(45) Date of Patent: Sep. 22, 2009

(54) NOZZLE FOR USE IN CONTINUOUS CASTING

(75) Inventors: Koji Ogata, Kitakyushu (JP); Saeko Koga, Kitakyushu (JP); Shinichi Fukunaga, Kitakyushu (JP)

(73) Assignee: Krosakiharima Corporation, Fukuoka (JP)

( * ) Notice: Subject to any disclaimer, the term of this patent is extended or adjusted under 35 U.S.C. 154(b) by 0 days.

(21) Appl. No.: 10/592,658

(22) PCT Filed: Mar. 14, 2005

(86) PCT No.: PCT/JP2005/004428

§ 371 (c)(1),
(2), (4) Date: Oct. 16, 2006

(87) PCT Pub. No.: WO2005/087406

PCT Pub. Date: Sep. 22, 2005

(65) Prior Publication Data

US 2008/0032882 A1    Feb. 7, 2008

(30) Foreign Application Priority Data

Mar. 15, 2004  (JP)  ............................. 2004-073578
Mar. 15, 2004  (JP)  ............................. 2004-073580

(51) Int. Cl.
*C21C 5/44* (2006.01)
*C21B 7/02* (2006.01)
*C21B 7/04* (2006.01)
*B22D 41/00* (2006.01)
*B22D 41/50* (2006.01)
*B22D 35/00* (2006.01)
*B22D 37/00* (2006.01)
*B22D 11/10* (2006.01)
*C04B 35/03* (2006.01)

(52) U.S. Cl. .................. 266/286; 266/280; 266/284; 222/591; 222/606; 164/437; 164/488; 501/113

(58) Field of Classification Search .................. 501/108, 501/113, 121; 266/286, 280, 284; 164/488, 164/437; 222/591, 606
See application file for complete search history.

(56) References Cited

U.S. PATENT DOCUMENTS 5,124,288 A * 6/1992 Ishikawa et al. ............ 501/121

(Continued)

FOREIGN PATENT DOCUMENTS

| JP | 61-53150 | 3/1986 |
| JP | 63-132755 | 6/1988 |
| JP | 05-154628 | 6/1993 |

(Continued)

*Primary Examiner*—Karl E Group
*Assistant Examiner*—Noah S Wiese
(74) *Attorney, Agent, or Firm*—Jordan and Hamburg LLP

(57) ABSTRACT

Disclosed is a continuous casting nozzle having a refractory portion formed to contain a dolomite clinker and arranged to define a surface region adapted to be in contact with molten steel, which is capable of protecting a working surface of the nozzle from alumina build-up due to alumina in molten steel, while improving corrosion resistance, even during long-term continuous casting of molten steel. The refractory portion is prepared by adding a binder to a mixed material and subjecting the obtained mixture to kneading, forming and heat treatment. The mixed material comprises a dolomite clinker which has an average particle size of 0.8 mm or less and a CaO content of 50 mass % or less. The mixed material has a ratio W1/W2 of 0.33 or more, wherein W1 is a content by mass of CaO, and W2 is a content by mass of MgO. The mixed material comprises a dolomite clinker and a magnesia clinker. Alternatively, the mixed material comprises a dolomite clinker and a magnesia clinker. The mixed material has a ratio WD/WM in the range of 0.5 to 15, wherein WD is a mass % of dolomite clinker particles having a particle size of 1 mm or less in a particle size distribution of the dolomite clinker, and WM is a mass % of magnesia clinker particles having a particle size of 1 mm or less in a particle size distribution of the magnesia clinker. Further, the mixed material has a ratio W1/W2 in the range of 0.33 to 3.0, wherein W1 is a content by mass % of a CaO component in the dolomite clinker, and W2 is a content by mass % of an MgO component in the magnesia clinker.

12 Claims, 2 Drawing Sheets

U.S. PATENT DOCUMENTS

| | | | | |
|---|---|---|---|---|
| 5,188,794 | A * | 2/1993 | Daussan et al. | 266/44 |
| 5,908,577 | A * | 6/1999 | Yamamura et al. | 222/606 |
| 6,410,469 | B1 * | 6/2002 | Hoover et al. | 501/101 |
| 6,537,486 | B1 * | 3/2003 | Benson et al. | 266/280 |

FOREIGN PATENT DOCUMENTS

| | | |
|---|---|---|
| JP | 05-200508 | 8/1993 |
| JP | 2004-082133 | 3/2004 |
| JP | 2004-322208 | 11/2004 |

* cited by examiner

NOZZLE FOR USE IN CONTINUOUS CASTING

TECHNICAL FIELD

The present invention relates to a continuous casting nozzle, such as a submerged nozzle, a shroud, a lower nozzle, an upper nozzle, a sliding nozzle (SN) plate and a tundish nozzle, for use in pouring molten steel from a tundish to a mould during continuous casting. In particular, the present invention relates to a continuous casting nozzle having a refractory portion formed to contain a dolomite clinker with an alumina build-up protecting function and arranged to define a region adapted to be in contact with molten steel.

BACKGROUND ART

In a nozzle for use in continuous casting, alumina inclusions in molten steel are apt to attach on a surface of an inner hole of the nozzle and coalesce into large inclusions. Such large alumina inclusions are highly likely to be mixed with a molten steel flow and incorporated in slabs, which will cause defects of the slabs and deteriorate quality thereof. In particular, this alumina build-up phenomenon occurs notably in continuous casting of aluminum-killed steel.

Late years, in connection with the need for strictly controlling the quality of steel products, particularly, high-grade steel for sheet metal etc., a good deal of effort has been made to protect a continuous casting nozzle from alumina build-up.

As one of measures against alumina build-up, there has been known a technique of injecting argon gas from a surface of an inner hole of the nozzle into molten steel to physically protect against alumina build-up. In this technique, if argon gas is injected in an excessive volume, gas bubbles will be incorporated into slabs to form pinholes in the slabs, resulting in defective slabs. In other words, an allowable volume of gas to be injected is limited to a relatively small value, and consequently this technique cannot exactly serve as a satisfactory solution.

There has been known another technique of providing an alumina build-up protecting function to a refractory portion itself constituting a continuous casting nozzle. Specifically, the refractory portion is formed to contain CaO so as to induce a reaction with alumina attached thereon to create a CaO—$Al_2O_3$ based low-melting-point compound. However, CaO contained in the refractory portion is likely to cause problems about increase in thermal expansion coefficient of the entire nozzle, causing deterioration in resistance to cracks, and hydration of CaO in the refractory material itself.

With a view to utilizing the above alumina build-up protecting function of the CaO-containing refractory portion while minimizing the adverse effects of the refractory portion, it has been proposed to arrange the refractory portion in a nozzle in such a manner as to define only a surface region adapted to be in contact with molten steel. For example, there has been known an submerged nozzle having a CaO-containing refractory portion arranged to define an inner hole. The CaO-containing refractory portion is arranged to define the inner hole in various manners, for example, by forming the refractory portion in a process of forming a body of an submerged nozzle as a single piece, or by forming only the nozzle body and then forming the refractory portion on a surface of a hole of the nozzle body through a coating or casting process, or by forming the refractory portion as a separate member with an inner hole (hole-defining member) and then attaching the hole-defining member to the nozzle body using mortar.

A CaO-containing material having an alumina build-up protecting function includes lime clinker, dolomite clinker and calcium zirconate.

For example, the following Patent Publication 1 discloses a molten-steel casting nozzle having a molten-steel channel which comprises an inside layer containing 20 to 97 mass % of lime clinker and 3 to 80 mass % of carbonaceous material, and an exposed layer containing 50 to 95 mass % of alumina-based material and 5 to 50 mass % of carbonaceous material. This publication also includes a description that a part of the lime clinker may be substituted with a dolomite clinker, or a calcium-zirconia clinker containing 20 wt % or more of CaO. However, in long-term continuous casting or in casting of molten steel containing a large amount of alumina suspended therein, the above nozzle is likely to cause a problem about increase in wear due to release of a low-melting-point compound created through a reaction between $Al_2O_3$ contained in molten steel and CaO contained in the clinker.

The following Patent Publication 2 discloses a continuous casting nozzle comprising a coating layer made of a calcareous material containing 50 to 100 mass % of CaO and formed as a wall of an inner hole of the nozzle at a given thickness. This publication also discloses a coating layer made of 80 mass % of dolomite clinker, and 20 mass % of magnesia clinker. While this coating layer can reduce the wear to some extent, it is necessary to further reduce the wear in view of practical use.

It is commonly believed that the refractory portion arranged to define an inner hole preferably has a thickness of about 1 mm at minimum and about 20 mm at maximum, and a material of the refractory portion preferably has a particle size of 1 mm or less. For example, the following Patent Publication 3 includes a description that an average particle size of the material is preferably set at 44 μm or less to have adequate surface properties.

As above, the refractory portion comprising a CaO-containing material, such as dolomite clinker, can react with alumina attached thereon to create a CaO—$Al_2O_3$ based low-melting-point compound which will be released from a surface of the refractory potion by a molten steel flow to exhibit an excellent aluminum build-up protecting function. However, this technique has been hardly put into practical use until now, due to difficulties in ensuring the compatibility with corrosion resistance.

[Patent Publication 1] Japanese Patent Laid-Open Publication No. 61-53150
[Patent Publication 2] Japanese Patent Laid-Open Publication No. 63-132755
[Patent Publication 3] Japanese Patent Laid-Open Publication No. 05-200508

DISCLOSURE OF INVENTION

In a continuous casting nozzle having a refractory portion formed to contain a dolomite clinker and arranged to define a surface region adapted to be in contact with molten steel, it is an object of the present invention to protect a working surface of the nozzle from alumina build-up due to alumina in molten steel, while improving corrosion resistance, even during long-term continuous casting of molten steel.

The present invention has been accomplished based on inventor's knowledge that, in a continuous casting nozzle having a refractory portion formed using a dolomite clinker as a CaO source to define at least a region adapted to be in contact with molten steel, while CaO in the dolomite clinker is consumed during use through a reaction with $Al_2O_3$ attached on the refractory portion, MgO in the dolomite clinker is left in a working surface and gradually enriched to form an MgO-rich layer having an MgO content of 50% or more, and the formed MgO-rich layer provides improved corrosion resistance.

With reference to FIG. 1, the above knowledge will be specifically described by taking a case where the refractory portion is formed as a hole-defining member of an submerged nozzle, as an example.

FIGS. 1(a) to 1(e) show changes in dolomite clinker particles in the hole-defining member arranged to define an inner hole of an submerged nozzle.

FIG. 1(a) shows the hole-defining member in an initial stage, wherein the dolomite clinker has MgO particles dispersed over a CaO crystal. When molten steel is supplied to pass through the inside of the hole-defining member, $Al_2O_3$ contained in the molten steel attaches on a working surface of the hole-defining member. The attached $Al_2O_3$ on the working surface has a particle size far less than that of the dolomite clinker. Thus, through a reaction with CaO in the dolomite clinker, the $Al_2O_3$ is absorbed in the dolomite clinker while creating a $CaO$—$Al_2O_3$ based compound.

FIG. 1(b) shows a second stage where $Al_2O_3$ successively attaches on the working surface. When the $Al_2O_3$ component in the dolomite clinker is increased, a $CaO$—$Al_2O_3$ reaction layer containing a large amount of $Al_2O_3$ is formed on a surface region of the dolomite clinker, as indicated by A in FIG. 1(b). In the $CaO$—$Al_2O_3$ reaction layer, a concentration of $Al_2O_3$ increases toward the working surface, and a $CaO$—$Al_2O_3$ based liquid phase is formed therein. In this liquid phase, the CaO component in the dolomite clinker will be continuously dissolved until a CaO concentration reaches a saturation value. As the result, a region of the dolomite clinker adjacent to the working surface is formed as a $CaO$—$Al_2O_3$ based liquid phase having a lower melting point and a higher fluidity.

Then, as shown in FIG. 1(c), the $CaO$—$Al_2O_3$ based liquid phase reduced in viscosity is released from the working surface by a molten steel flow, while leaving MgO particles therein. MgO particles in the dolomite clinker are hardly released because at least a part of them would be originally connected together in a cluster configuration to maintain a coagulation power even if the surrounding thereof is changed to a liquid phase. That is, it is believed that MgO particles in a first region closer to the working surface are pulled by MgO particles in a second region on the opposite side of the first region with respect to the working surface, and therefore only the low-viscosity $CaO$—$Al_2O_3$ based liquid phase is released from the first region while allowing the MgO particles in the first region to be moved in a direction away from the working surface. In this manner, the MgO particles in the $CaO$—$Al_2O_3$ reaction layer are repeatedly moved and agglomerated, i.e., increased in particle size. Thus, an MgO-rich layer (B in FIG. 1(c)) will be successively formed adjacent to the working surface. It is considered that a thickness of the $CaO$—$Al_2O_3$ reaction layer to be formed is determined by a penetration depth of $Al_2O_3$ in the dolomite clinker.

Then, as shown in FIG. 1(d), while the CaO concentration in the MgO-rich layer is apt to be lowered because $Al_2O_3$ frequently attaches on the MgO-rich layer, CaO in the region of the reaction layer on the back side of the MgO-rich layer is diffused toward the working surface through the MgO-rich layer to supply CaO to the MgO-rich layer. Thus, the $CaO$—$Al_2O_3$ based liquid phase will be substantially successively formed adjacent to the working surface of the dolomite clinker. This makes it possible to prevent $Al_2O_3$ in molten steel from attaching on the working surface. Further, CaO is moved through between MgO particles in the MgO-rich layer formed adjacent to the working surface. This makes it possible to prevent CaO from being excessively released from a region adjacent to the working surface so as to provide improved corrosion resistance.

FIG. 1(e) shows the hole-defining member in a final stage, and FIG. 2 is a micrograph showing the structure of a working surface of the hole-defining member after usage. As seen in FIGS. 1(e) and 2, agglomerated MgO particles are formed in a direction parallel to the working surface, and a structure formed as a $CaO$—$Al_2O_3$ compound exists around the agglomerated MgO particles.

It is believed that, while the above reaction layer is generally formed in the respective dolomite clinker particles, the particles adjacent to the working surface are integrated together to form a continuous reaction layer, and this continuous reaction layer will be extendingly formed over the entire surface of the inner hole. Thus, it is important to stably maintain this reaction layer for a long time-period during casting.

As above, the formation of a magnesia-rich layer is effective in providing improved corrosion resistance to a continuous casting nozzle using a dolomite clinker. From this point of view, a research on applicability of a synthetic dolomite clinker having a larger magnesia content than that of a natural dolomite clinker was made. As the result of the research, it was proved that, while a dolomite clinker having a larger magnesia content is advantageous to improvement in corrosion resistance, it is disadvantageous to resistance to alumina build-up (alumina build-up resistance), due to relative reduction in CaO content. As the result of a research on a technique for satisfying both the formation of a magnesia-rich layer in a working surface region and the alumina build-up resistance, it was proved that it is effective to set an average particle size of clinker at 0.8 mm or less.

According to a first aspect of the present invention, there is provided a continuous casting nozzle having a refractory portion arranged in at least a region adapted to be in contact with molten steel. The refractory portion is prepared by adding a binder to a mixed material and subjecting the obtained mixture to kneading, forming and heat treatment. The mixed material comprises a dolomite clinker which has an average particle size of 0.8 mm or less and a CaO content of 50 mass % or less. The mixed material has a ratio W1/W2 of 0.33 or more, wherein W1 is a content by mass of CaO, and W2 is a content by mass of MgO.

As used in this specification, the term "average particle size" means a median size, and a particle size having a mass percentage of 50% in a mass cumulative graph formed by plotting actually measured particle sizes. The particle size may be measured using, for example, a sieve.

In the continuous casting nozzle set forth in the first aspect of the present invention, the mixed material may further comprise, in combination, a dolomite clinker having a CaO content of greater than 50 mass %, and/or a magnesia clinker.

The dolomite clinker with a CaO content of 50 mass % or less has an average particle size of 0.8 mm or less. If the average particle size exceeds 0.8 mm, alumina build-up will be undesirably accelerated.

The reason is that alumina is more likely to attach on a dolomite clinker particle having a larger particle size, and a range of alumina build-up extends around from the clinker particle having attached alumina thereon. Thus, the level of average particle size has an influence on the alumina build-up. In other words, when a content of CaO in a dolomite clinker is reduced, a content ratio of MgO is increased to prevent attached alumina from easily melting. Thus, the reduction in CaO content has a great impact on the alumina build-up. Further, it is believed that, when the average particle size becomes smaller, the number of grain boundaries is increased, and these grain boundaries oblige alumina to diffuse or penetrate therethrough so as to reduce the alumina build-up.

A synthetic dolomite clinker prepared using an artificial material to have an arbitrary composition may be suitably used as the clinker with a CaO content of 50 mass % or less. While a lower limit of the CaO content is not limited to a specific value, it should be set at an appropriate value depending on use conditions and results after usage. The CaO content may be increased when it is necessary to put a higher priority on the alumina build-up protecting function, or may be reduced when it is necessary to put a higher priority on the corrosion resistance. In this case, the mass ratio W1/W2 of the CaO content W1 to the MgO content W2 must be 0.33 or more in the entire mixed material including other aggregate, to effectively develop both the alumina build-up protecting function and the magnesia-rich-layer forming function. Preferably, an upper limit of the mass ratio W1/W2 is set at 3.0 or less. Generally, the CaO content in the dolomite clinker is preferably set at 20% or more.

While the mixed material may consist only of the dolomite clinker having a CaO content of 50 mass % or less, the mixed material may further comprise, in combination, a dolomite clinker having a CaO content of greater than 50 mass %, as mentioned above. Generally, a dolomite clinker having a relatively large CaO content is excellent in alumina build-up resistance. Thus, such a dolomite clinker may be combined with a synthetic dolomite clinker having a relatively small CaO content to achieve a proper balance with the corrosion resistance. Alternatively or additionally, the mixed material may further comprise, in combination, a magnesia clinker to improve the corrosion resistance. In this case, the magnesia clinker is preferably used in a fine particle region of the dolomite clinker to avoid deterioration in the alumina build-up resistance.

While the binder for use in preparing the refractory portion may be an inorganic binder or an organic binder commonly used with a refractory material, it is preferable to use an organic binder. The organic binder is used for forming a carbon bond. More preferably, a thermosetting organic resin, such as phenol resin or furan resin, may be used. The carbon bond provides excellent high-temperature strength. Thus, the organic binder may be applied to a region adapted to be in contact with molten steel, such as a hole-defining member, to provide enhanced durability.

As mentioned above, a refractory material for the refractory portion arranged in at least a region adapted to be in contact with molten steel may consist only of a dolomite clinker or may comprise a combination of a dolomite clinker and a magnesia clinker. Additionally, the mixed material may include any other suitable material having no adverse effect on the intended functions to obtain an effect peculiar to the material. For example, the mixed material may include a refractory material, such as alumina, silica, zirconia, silicon carbide, silicon nitride, carbon black, pitch, tar or graphite; a metal powder, such as Al powder or Si powder; an antioxidant, such as B4C; or (and/or) frits, in a small amount, for example, in an amount of 5 mass % or less.

The refractory portion arranged in at least a region adapted to be in contact with molten steel is prepared by adding the above binder to the mixed material and subjecting the obtained mixture to kneading, forming and heat treatment. In the mixed material, the mass ratio W1/W2 of the CaO content W1 to the MgO content W2 is set at 0.33 or more, preferably in the range of 0.33 to 3.0, as mentioned above.

The ratio W1/W2 or CaO/MgO may be controlled by adjusting a ratio of a CaO content to an MgO content in a dolomite clinker to be used, and/or a ratio of a dolomite clinker and a magnesia clinker to be used. If the ratio W1/W2 is less than 0.33, an amount of CaO to be supplied to the working surface region will become insufficient to cause difficulty in creating an adequate $CaO$—$Al_2O_3$ based liquid phase. Consequently, alumina inclusions are more likely to attach on the working surface.

If an amount of MgO in the refractory portion, such as a hole-defining member, is excessively increased, spalling and/or cracks are more likely to occur. If the ratio W1/W2 exceeds 3.0, the amount of CaO to be supplied to the working surface region will be unduly accelerated to excessively create a $CaO$—$Al_2O_3$ based liquid phase and hinder the MgO-rich layer serving as a protective layer from being adequately formed, resulting in serious wear. Moreover, the components of the liquid-phase and/or the aggregates of the refractory portion dropped out due to the wear will be mixed in molten steel to cause deterioration in quality of slabs.

The mixed material for the refractory portion arranged in at least a region adapted to be in contact with molten steel may include a carbonaceous material to absorb and relax a strain in the refractory portion due to thermal expansion, so as to provide enhanced structural stability. An amount of carbonaceous material is set preferably at 10 mass % or less, more preferably at 5 mass % or less. If the amount of carbonaceous material exceeds 10 mass %, the oxidation of carbon component due to oxygen in molten steel, and the elusion of carbon component into the molten steel will be increased to undesirable accelerate wear.

The carbonaceous material may include pitch, tar, carbon black and scaled graphite.

In this case, the organic binder, such as thermosetting organic resin, is not included in the carbonaceous material When no graphite-based material, such as scaled graphite, among the carbonaceous material, is used in the mixed material containing the dolomite clinker, enhanced durability can be effectively obtained. Thus, if a higher priority is put on durability, it is preferable to use no graphite-based material, or add the graphite-based material in an amount of 3 mass % or less.

As a solution for facilitating formation of the MgO-rich layer in the working surface region of the refractory portion using a dolomite clinker as a CaO source, according to a second aspect of the present invention, there is provided a continuous casting nozzle having a refractory portion arranged in at least a region adapted to be in contact with molten steel. The refractory portion is prepared by adding a binder to a mixed material and subjecting the obtained mixture to kneading, forming and heat treatment. The mixed material comprises a dolomite clinker and a magnesia clinker. The mixed material has a ratio WD/WM in the range of 0.5 to 15, wherein W1 is a mass % of dolomite clinker particles having a particle size of 1 mm or less in a particle size distribution (gradation) of the dolomite clinker, and WM is a mass % of magnesia clinker particles having a particle size of 1 mm or less in a particle size distribution of the magnesia clinker. Further, the mixed material has a ratio W1/W2 in the range of 0.33 to 3.0, wherein W1 is a content by mass % of a CaO component in the dolomite clinker, and W2 is a content by mass % of an MgO component in the magnesia clinker. This continuous casting nozzle can achieve enhanced corrosion resistance while maintaining the alumina build-Lip resistance.

In the refractory portion, a region having fine particles having a particle size of 1 mm or less has a larger number of grain boundaries as compared with a region having coarse particles. Thus, wear is accelerated in the fine particle region to cause the phenomenon that MgO particles drop out due to melting along the grain boundaries before formation of the magnesia-rich layer. As measures against this problem, fine particles of magnesia clinker may be appropriately dispersed over fine particles of the dolomite clinker to reinforce the grain boundaries between the dolomite clinker particles and allow the dispersed magnesia clinker particles and the magnesia-rich layer formed from the dolomite clinker to be integrated together so as to form a layer having further enhanced corrosion resistance.

Given that a percentage of dolomite clinker particles having a particle size of 1 mm or less is WD, and a percentage of magnesia clinker particles having a particle size of 1 mm or less is WM, the ratio WD/WM can be set in the range of 0.5 to 15 to improve the corrosion resistance while maintaining the aluminum build-up resistance. If the ratio WD/WM is less than 0.5, the alumina build-up protecting function will undesirably deteriorate due to reduction in amount of CaO even though improved corrosion resistance can be obtained. If the ratio WD/WM exceeds 15, the amount of magnesia clinker will be relatively reduced to an undue extent to cause undesirable deterioration in function of reinforcing the grain boundaries between the dolomite clinker particles, i.e., in function of improving the corrosion resistance. Preferably, the ratio WD/WM is set in the range of 1 to 10.

The dolomite clinker is a refractory material having a primary component of CaO and MgO. Any dolomite clinker commonly used as a material of dolomite-based brick etc., may be used without problems. For example, the dolomite clinker to be used may include a dolomite clinker obtained by subjecting a natural dolomite clinker to a heat treatment, or a synthetic dolomite clinker prepared using an artificial material to have an arbitrary composition. The dolomite clinker to be used may also include a dolomite clinker subjected to a surface treatment to prevent hydration of CaO, for example, a dolomite clinker coated with calcium phosphate.

The magnesia clinker to be used may include any magnesia clinker commonly used as a refractory material, such as sintered magnesia clinker or fused magnesia clinker.

While the binder to be use may include an inorganic binder or an organic binder commonly used with a refractory material, it is preferable to use an organic binder. The organic binder is used for forming a carbon bond. More preferably, a thermosetting organic resin, such as phenol resin or furan resin, may be used. The carbon bond provides excellent high-temperature strength. Thus, the organic binder may be applied to a region adapted to be in contact with molten steel, such as a hole-defining member, to provide enhanced durability.

In addition to the dolomite clinker and the magnesia clinker, the mixed material for the refractory portion arranged in at least a region adapted to be in contact with molten steel may include any other suitable material having no adverse effect on the intended functions to obtain an effect peculiar to the material. For example, the mixed material may include a refractory material, such as alumina, silica, zirconia, silicon carbide, silicon nitride, carbon black, pitch, tar or graphite; a metal powder, such as Al powder or Si powder; an antioxidant, such as B4C; or frits, in a small amount, for example, in an amount of 5 mass % or less.

The refractory portion arranged in at least a region adapted to be in contact with molten steel is prepared by adding the above binder to the mixed material and subjecting the obtained mixture to kneading, forming and heat treatment. In the mixed material, the mass ratio W1/W2 of the CaO content W1 to the MgO content W2 is set in the range of 0.33 to 3.0. The ratio W1/W2 or CaO/MgO may be controlled by adjusting a ratio of a CaO content to an MgO content in a dolomite clinker to be used, and/or a ratio of a dolomite clinker and a magnesia clinker to be used. If the ratio W1/W2 is less than 0.33, an amount of CaO to be supplied to the working surface region will become insufficient to cause difficulty in creating an adequate CaO—$Al_2O_3$ based liquid phase. Consequently, alumina inclusions are more likely to attach on the working surface.

If an amount of MgO in the refractory portion, such as a hole-defining member, is excessively increased, spalling and/or cracks are more likely to occur. If the ratio W1/W2 exceeds 3.0, the amount of CaO to be supplied to the working surface region will be unduly accelerated to excessively create a CaO—$Al_2O_3$ based liquid phase and hinder the MgO-rich layer serving as a protective layer from being adequately formed, resulting in serious wear. Moreover, the components of the liquid-phase and/or the aggregates of the refractory portion dropped out due to the wear will be mixed in molten steel to cause deterioration in quality of slabs.

The mixed material for the refractory portion arranged in at least a region adapted to be in contact with molten steel may include a carbonaceous material to absorb and relax a strain in the refractory portion due to thermal expansion, so as to provide enhanced structural stability. An amount of carbonaceous material is set preferably at 10 mass % or less, more preferably at 5 mass % or less. If the amount of carbonaceous material exceeds 10 mass %, the oxidation of carbon component due to oxygen in molten steel, and the elusion of carbon component into the molten steel will be increased to undesirable accelerate wear. The carbonaceous material may include pitch, tar, carbon black and scaled graphite. In this case, the organic binder, such as thermosetting organic resin, is not included in the carbonaceous material When no graphite-based material, such as scaled graphite, among the carbonaceous material, is used in the mixed material containing the dolomite clinker, enhanced durability can be effectively obtained. Thus, if a higher priority is put on durability, it is preferable to use no graphite-based material, or add the graphite-based material in an amount of 3 mass % or less.

In the immersed nozzle for the continuous casting of the present invention, the inner hole may be arranged in various manners, for example, by forming the refractory portion simultaneously and integrally with an inner hole in a nozzle body of a continuous casting nozzle in a process of forming the continuous casting nozzle, or by forming the refractory portion as a separate hole-defining member and then attaching the hole-defining member to a hole in the nozzle body of a continuous casting nozzle.

For example, in the process of forming the refractory portion simultaneously and integrally with an inner hole in a nozzle body of a continuous casting nozzle, a mixed material of the nozzle body and a mixed material of the refractory portion are kneaded separately. In the kneading, the organic binder, such as phenol resin, is added thereto. Then, a cylindrical partition is set in a nozzle mould to separate respective spaces for the refractory portion and the nozzle body. The kneaded material of the nozzle body and the kneaded material of the refractory portion are filled, respectively, in the refractory-portion space and the nozzle-body space. After removing the partition, the kneaded materials are formed into a given shape by cold isostatic press (CIP). After the forming, the obtained product is subjected to a heat treatment to obtain a continuous casting nozzle having a dolomite clinker-containing refractory portion arranged in a surface region adapted to be in contact with molten metal.

EFFECT OF THE INVENTION

As above, in a continuous casting nozzle having a dolomite clinker-containing refractory portion arranged in a surface region adapted to be in contact with molten metal, the present invention can provide enhanced corrosion resistance and a significantly extended life duration of the continuous casting nozzle. This makes it possible to drastically reduce a cost of the continuous casting nozzle itself and a cost required for replacing the continuous casting nozzle.

BEST MODE FOR CARRYING OUT THE INVENTION

The present invention will now be described based on examples.

Example 1

Example 1 is based on the first aspect of the present invention.

On the assumption that a refractory portion consisting of a dolomite clinker containing 40% of CaO was arranged in a region of a continuous casting nozzle adapted to be in contact with molten metal, influences of an average particle size of the dolomite clinker on corrosion resistance and alumina build-up resistance were checked.

Table 1 shows respective mixing percentages in mixed materials each using a dolomite clinker A which comprises a primary component of 40 mass % of CaO and 60 mass % of MgO. An appropriate amount of phenol resin was added to each of the mixed materials, and evenly kneaded. The kneaded material was formed into a given shape through a press forming process, and the obtained product was subjected to a heat treatment. Each of the obtained samples was subjected to an experimental test.

A test for corrosion resistance was performed by melting low-carbon aluminum-killed steel, keeping the molten steel at 1550° C., immersing the sample into the molten steel while rotating the sample at a circumferential velocity of 1.5 m/sec, and pulling up the sample after an elapse of a given time to measure a wear rate. The wear rate was expressed by an index on the basis of 100 representing a wear rate in Comparative Example 1-1, wherein a smaller index indicates better corrosion resistance.

A test for aluminum build-up resistance was performed by immersing the sample into low-carbon aluminum-killed steel at 1550° C. while keeping the sample stationary and adding 0.5% of aluminum into the molten steel every 30 minutes to allow alumina to be suspended in the molten steel, and pulling up the sample after an elapse of 4 hours to measure a rate of alumina build-up onto the sample. The build-up rate was expressed by an index on the basis of 100 representing a wear rate in Comparative Example 1-1, wherein a smaller index indicates better alumina build-up resistance.

While no significant difference between Inventive Examples and Comparative Examples was observed in the evaluation result of corrosion resistance, Inventive Examples 1-1 to 1-3 had better results of alumina build-up resistance as compared with Comparative Examples 1-1 and 1-2. This shows that the average particle size of the dolomite clinker having a CaO content of 50% or less is preferably set at 0.8 mm or less.

Table 2 shows respective mixing percentages of a dolomite clinker A containing 40 mass % of CaO, a dolomite clinker B containing 20 mass % of CaO, a dolomite clinker C containing 60 mass % of CaO, a magnesia clinker and carbon black. These materials were mixed to prepare a plurality of mixed materials. Then, an appropriate amount of phenol resin was added to each of the mixed materials, and evenly kneaded. The kneaded material was formed into a given shape through a press forming process, and the obtained product was subjected to a heat treatment. Each of the obtained samples was subjected to the tests for corrosion resistance and aluminum build-up resistance, and evaluated in the same manner as that in Table 1.

TABLE 1

|  | Comparative Example 1-1 | Comparative Example 1-2 | Inventive Example 1-1 | Inventive Example 1-2 | Inventive Example 1-3 |
| --- | --- | --- | --- | --- | --- |
| Mixing ratio (weight %) | | | | | |
| Dolomite clinker A (CaO = 40%) | | | | | |
| 2-1 mm | 60 | 40 | 30 | 10 | |
| 1-0.4 mm | 20 | 35 | 35 | 50 | 60 |
| 0.4-0 mm | 20 | 25 | 35 | 40 | 40 |
| Phenol resin | q.s.*** | q.s. | q.s. | q.s. | q.s. |
| Average particle size of dolomite clinker A (mm) | 1.20 | 0.84 | 0.76 | 0.55 | 0.50 |
| W1/W2 | 0.67 | 0.67 | 0.67 | 0.67 | 0.67 |
| Wear rate* | 100 | 98 | 101 | 102 | 107 |
| Build-up rate** | 100 | 95 | 81 | 60 | 43 |

*An index on the basis of 100 representing a wear rate in Comparative Example 1-1, wherein a smaller index indicates better corrosion resistance.
**An index on the basis of 100 representing a build-up rate in Comparative Example 1-1, wherein a smaller index indicates better build-up resistance.
***Appropriate amount

TABLE 2

|  | Inventive Example 1-4 | Inventive Example 1-5 | Inventive Example 1-6 | Inventive Example 1-7 | Inventive Example 1-8 |
|---|---|---|---|---|---|
| Mixing ratio (weight %) | | | | | |
| Dolomite clinker A (CaO = 40%) | | | | | |
| 2-1 mm | | | | 10 | |
| 1-0.4 mm | 30 | 30 | 20 | 50 | 30 |
| 0.4-0 mm | 28 | | | 20 | 10 |
| Dolomite clinker B (CaO = 20%) | | | | | |
| 2-1 mm | | | 10 | | |
| 1-0.4 mm | | | 20 | | 20 |
| 0.4-0 mm | | 28 | 23 | | |
| Dolomite clinker C (CaO = 60%) | | | | | |
| 2-1 mm | 40 | 40 | | | 20 |
| 1-0.4 mm | | | 25 | | |
| Magnesia clinker | | | | | |
| 0.2-0 mm | | | | 18 | 18 |
| Carbon black | 2 | 2 | 2 | 2 | 2 |
| Phenol resin | q.s.*** | q.s. | q.s. | q.s. | q.s. |
| Average particle size of dolomite clinkers A and B (mm) | 0.43 | 0.42 | 0.61 | 0.63 | 0.65 |
| W1/W2 | 0.93 | 0.74 | 0.52 | 0.48 | 0.48 |
| Wear rate* | 105 | 91 | 85 | 78 | 74 |
| Build-up rate** | 31 | 44 | 77 | 85 | 83 |

*An index on the basis of 100 representing a wear rate in Comparative Example 1-1 in Table 1, wherein a smaller index indicates better corrosion resistance.
**An index on the basis of 100 representing a build-up rate in Comparative Example 1-1 in Table 1, wherein a smaller index indicates better build-up resistance.
***Appropriate amount As seen in the test result, when an average particle size of the dolomite clinkers A and B each having a CaO content of 50 mass % or less is set at 0.8 mm or less, an excellent result can be obtained even if the dolomite clinker and/or the magnesia clinker are used in combination.

Further, each of the mixed materials of Inventive Example 1-2 and Comparative Example 1-1 was subjected to kneading and forming to prepare a cylindrical-shaped sleeve having a thickness of 10 mm, as a hole-defining member, and the obtained product was subjected to a heat treatment. Then, the sleeve was arranged to define an inner hole of an submerged nozzle through magnesia-based mortar, and the submerged nozzle was subjected to an actual test.

Specifically, each of the submerged nozzles was used in casting of aluminum-killed steel. The casting was performed under the following conditions: a volume of a ladle=250 ton; a volume of a tundish=45 ton; a drawing rate of slabs=1.0 to 1.3 m/min; and a casting time=about 280 minutes.

After casting, each of the submerged nozzles was cut to observe respective cross-sections of the hole-defining members thereof. As the result, while the hole-defining member using the mixed material of Comparative Example 1-1 partially had an aluminum build-up of up to 4 mm, almost no alumina build-up was observed in the hole-defining member using the mixed material of Inventive Example 1-2. That is, the submerged nozzle using the mixed material of Inventive Example 1-2 clearly has a better result.

Example 2

Example 2 is based on the second aspect of the present invention.

Table 3 shows a type of dolomite clinker and magnesia clinker, a particle size distribution, a mixing percentage, respective ratios WD/WM and W1/W2 in mixed materials, and respective wear and build-up rates in refractory portions using each of the mixed materials, in Inventive Examples and Comparative Examples.

A synthetic dolomite clinker used in the mixed materials has a CaO content of 60 mass % and an MgO content of 40 mass %.

The materials were mixed in the mixing percentages as shown in Table 3 to prepare the mixed materials. Then, an appropriate amount of phenol resin was added to each of the mixed materials, and evenly kneaded. The kneaded material was formed into a given shape through a press forming process, and the obtained product was subjected to a heat treatment at 1000° C. Each of the obtained samples was subjected to tests for corrosion resistance and aluminum build-up resistance.

An evaluation of corrosion resistance based on a wear rate was performed by melting low-carbon aluminum-killed steel by a high-frequency furnace, keeping the molten steel at 1550° C., immersing the sample into the molten steel for 4 hours while rotating the sample at a circumferential velocity of 1.5 m/sec, and then pulling up the sample to measure a wear rate. The wear rate was expressed by an index on the basis of 100 representing a wear rate in Comparative Example 2-1, wherein a smaller index indicates better corrosion resistance.

TABLE 3

| | Comparative Example 2-1 | Comparative Example 2-2 | Inventive Example 2-1 | Inventive Example 2-2 | Inventive Example 2-3 | Inventive Example 2-4 | Inventive Example 2-5 | Inventive Example 2-6 |
|---|---|---|---|---|---|---|---|---|
| Mixing ratio (weight %) | | | | | | | | |
| Natural dolomite clinker | | | | | | | | |
| 3-1 mm | 20 | 20 | 20 | 20 | 25 | 20 | 20 | 20 |
| 1-0.2 mm | 20 | 20 | 20 | 20 | 30 | 20 | 20 | 20 |
| 0.2-0 mm | 35 | 35 | 35 | 35 | 35 | 35 | 35 | 35 |
| Fused magnesia clinker | | | | | | | | |
| 3-1 mm | 24 | 22 | 21 | 19 | | 15 | 10 | |
| 1-0.2 mm | | | | | | | 5 | 10 |
| 0.2-0 mm | 1 | 3 | 4 | 6 | 10 | 10 | 10 | 15 |
| Pitch powder | | | | | | | | |
| Phenol resin | q.s.*** | q.s. | q.s. | q.s. | q.s. | q.s. | q.s. | q.s. |
| Percentage of dolomite clinker particles with a particle size of 1 mm or less; WD | 55 | 55 | 55 | 55 | 65 | 55 | 55 | 55 |
| Percentage of magnesia clinker particles with a particle size of 1 mm or less; WM | 1 | 3 | 4 | 6 | 10 | 10 | 15 | 25 |
| WD/WM | 55.0 | 18.3 | 13.8 | 9.2 | 6.5 | 5.5 | 3.7 | 2.2 |
| W1/W2 | 0.82 | 0.82 | 0.82 | 0.82 | 1.17 | 0.82 | 0.82 | 0.82 |
| Wear rate* | 100 | 98 | 92 | 81 | 75 | 62 | 51 | 46 |
| Build-up rate** | 100 | 98 | 97 | 98 | 85 | 96 | 97 | 97 |

| | Inventive Example 2-7 | Inventive Example 2-8 | Inventive Example 2-9 | Inventive Example 2-10 | Comparative Example 2-3 | Comparative Example 2-4 | Inventive Example 2-11 |
|---|---|---|---|---|---|---|---|
| Mixing ratio (weight %) | | | | | | | |
| Natural dolomite clinker | | | | | | | |
| 3-1 mm | | | | 20 | 15 | 15 | |
| 1-0.2 mm | 30 | 30 | 20 | 10 | 10 | 10 | 30 |
| 0.2-0 mm | 35 | 30 | 30 | 15 | 10 | 5 | 30 |
| Fused magnesia clinker | | | | | | | |
| 3-1 mm | | | | 5 | 15 | 15 | |
| 1-0.2 mm | 20 | 20 | 30 | 30 | 30 | 30 | 20 |
| 0.2-0 mm | 15 | 20 | 20 | 20 | 20 | 25 | 20 |
| Pitch powder | | | | | | | 4 |
| Phenol resin | q.s. | q.s. | q.s. | q.s. | q.s. | q.s. | q.s. |
| Percentage of dolomite clinker particles with a particle size of 1 mm or less; WD | 65 | 60 | 50 | 25 | 20 | 15 | 60 |
| Percentage of magnesia clinker particles with a particle size of 1 mm or less; WM | 35 | 40 | 50 | 50 | 50 | 55 | 40 |
| WD/WM | 1.9 | 1.5 | 1.0 | 0.50 | 0.40 | 0.27 | 1.5 |
| W1/W2 | 0.64 | 0.56 | 0.43 | 0.37 | 0.27 | 0.22 | 0.56 |
| Wear rate* | 41 | 38 | 35 | 33 | 32 | 30 | 43 |
| Build-up rate** | 102 | 106 | 109 | 115 | 134 | 175 | 107 |

*An index on the basis of 100 representing a wear rate in Comparative Example 2-1, wherein a smaller index indicates better corrosion resistance.
**An index on the basis of 100 representing a build-up rate in Comparative Example 2-1, wherein a smaller index indicates better build-up resistance.
***Appropriate amount An evaluation of aluminum build-up resistance was performed by immersing the sample into low-carbon aluminum-killed steel at 1550° C. while keeping the sample stationary and adding 0.5% of aluminum into the molten steel every 30 minutes to allow alumina to be suspended in the molten steel, and pulling up the sample after an elapse of 4 hours to measure a rate of alumina build-up onto the sample. The build-up rate was expressed by an index on the basis of 100 representing a wear rate in Comparative Example 2-1, wherein a smaller index indicates better alumina build-up resistance.

As the result of the evaluation of corrosion resistance, it was verified that the corrosion resistance is improved as the ratio WD/WM is lowered. When the ratio WD/WM exceeds 15, almost no improvement in corrosion resistance is exhibited. Thus, the ratio WD/WM must be set at 15 or less. Further, when the ratio WD/WM is set at 10 or less, the corrosion resistance is more significantly improved.

As the result of the evaluation of alumina build-up resistance, it was verified that the alumina build-up rate is gradually increased when the ratio WD/WM is reduced to 2 or less. In particular, the alumina build-up is significantly increased when the ratio WD/WM is reduced to less than 0.5. Thus, the ratio WD/WM must be set at 0.5 or more. Further, when the ratio WD/WM is set at 1.0 or more, the alumina build-up is reduced to an negligible level, and the corrosion resistance is largely improved.

Further, each of the mixed materials of Inventive Example 2-6 and Comparative Example 2-1 in Table 3 was subjected to kneading and forming to prepare a cylindrical-shaped sleeve having a thickness of 10 mm, as a hole-defining member, and the obtained product was subjected to a heat treatment. Then, the sleeve was arranged to define an inner hole of an submerged nozzle through magnesia-based mortar.

Each of the submerged nozzles was used in casting of 1000 t of aluminum-killed steel. After casting, each of the submerged nozzles was cut to observe respective cross-sections thereof. As the result, both the nozzles had excellent results i.e., only very few aluminum build-up. While the nozzle using the mixed materials of Inventive Example 2-6 had a wear of less than 1 mm, the nozzle using the mixed materials of Comparative Example 2-1 partially has a wear of about 5 mm, which is clearly larger than that in he nozzle using the mixed materials of Inventive Example 2-6.

INDUSTRIAL APPLICABILITY

The continuous casting nozzle of the present invention is usable as a nozzle for use in continuous casting of steel, such as an submerged nozzle, a shroud, a lower nozzle, an upper nozzle, a sliding nozzle plate or an tundish nozzle.

Among these continuous casting nozzles, the continuous casting nozzle of the present invention is most suitably used as an submerged nozzle which otherwise has large alumina build-up.

Figure 1:
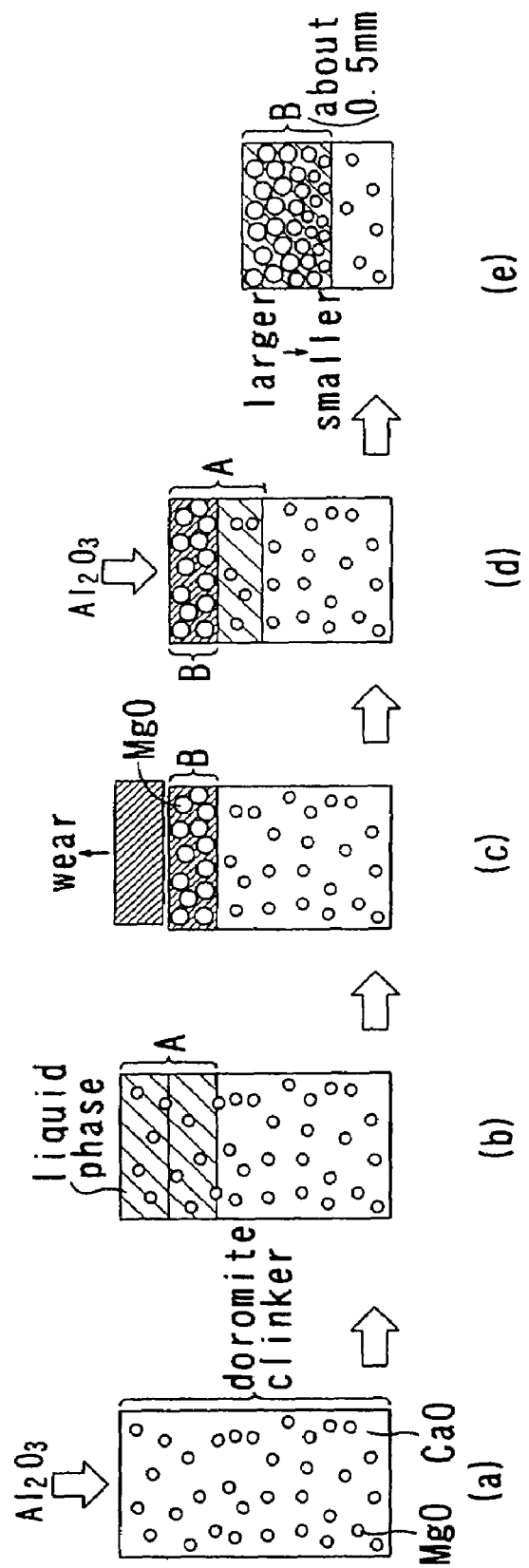
FIG. 1 is an explanatory diagram showing an assumptive mechanism in one example where the present invention is applied to a hole-defining member of an submerged nozzle.
Figure 2:
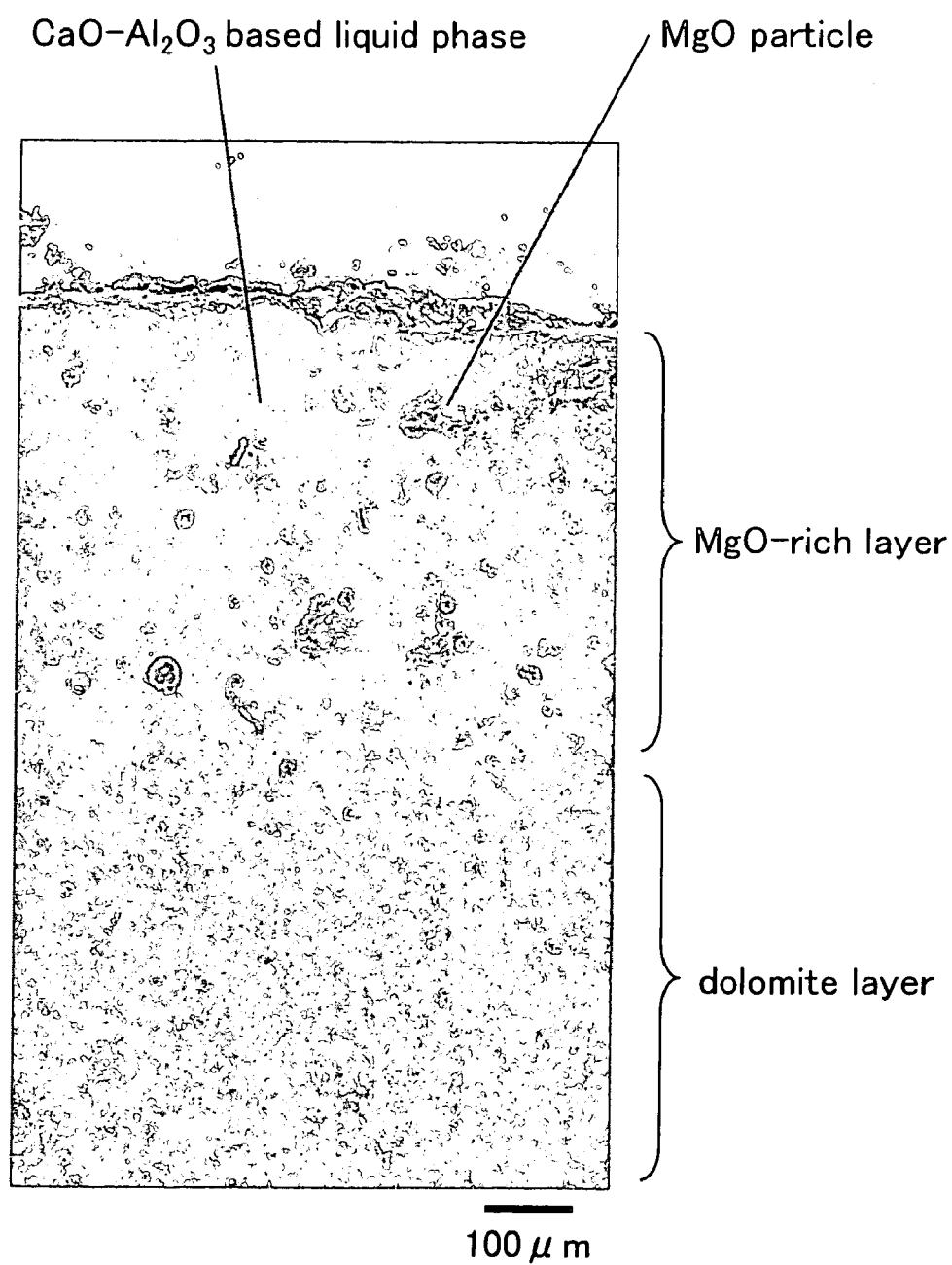
FIG. 2 is a micrograph showing the structure of a working surface of the hole-defining member after usage.

What is claimed is:

1. An immersion nozzle for continuous casting aluminum killed molten iron, said nozzle having an inner passage through which the aluminum killed molten iron flows, a refractory material applied to said passage, said refractory material being prepared by adding a thermosetting resin binder to a mixture of synthetic dolomite clinker and magnesia clinker, and then kneading, pressure forming and subjecting the mixed material to thermal treatment, said synthetic dolomite clinker having an average particle size of 0.8 mm or less and a CaO content of 50 mass % or less, said mixed material having a ratio W1/W2 of 0.33 or more, wherein W1 is a content by mass of CaO, and W2 is a content by mass of MgO, and during casting, as the CaO in the dolomite is consumed by reaction with deposited alumina, MgO in the dolomite clinker forms an MgO-rich layer, improving corrosion resistance of the refractory material applied to the inner passage of the immersion nozzle.

2. An immersion nozzle for continuous casting aluminum killed molten iron, said nozzle having an inner passage through which the aluminum killed molten iron flows, a refractory material applied to said passage, said refractory material being prepared by adding a thermo-setting resin binder to a mixture of synthetic dolomite clinker, magnesia clinker and a carbonaceous material of 5 mass % or less with respect to 100 mass % of said mixture, and then kneading, pressure forming and subjecting the mixed material to thermal treatment, said synthetic dolomite clinker having an average particle size of 0.8 mm or less and a CaO content of 50 mass % or less, said mixed material having a ratio W1/W2 of 0.33 or more, wherein W1 is content by mass of CaO, and W2 is content by mass of MgO, and during casting, as the CaO in the dolomite is consumed by reaction with deposited alumina, MgO in the dolomite clinker forms an MgO-rich layer, improving corrosion resistance of the refractory applied to the inner passage of the nozzle.

3. An immersion nozzle for continuous casting aluminum killed molten iron, said nozzle having an inner passage through which the aluminum killed molten iron flows, a refractory material applied to said passage, said refractory material being prepared by adding a thermo-setting resin binder to a mixture of dolomite clinker and magnesia clinker, then kneading, pressure forming and subjecting the mixture to thermal treatment, said mixed material having a ratio WD/WM in the range of 0.5 to 15, wherein WD is a mass % of the dolomite clinker particles having a particle size of 1 mm or less, and WM is a mass % of magnesia clinker particles having a particle size of 1 mm or less, and a ratio W1/W2 in the range of 0.33 to 3.0, wherein W1 is a content by mass % of a CaO component, and W2 is a content by mass % of MgO, and during casting, as the CaO in the dolomite is consumed by reaction with deposited alumina, MgO in the dolomite clinker and in the magnesia clinker forms an MgO-rich layer, improving corrosion resistance of the refractory applied to the inner passage of the immersion nozzle.

4. An immersion nozzle for continuous casting aluminum killed molten iron, said nozzle having an inner passage through which the aluminum killed molten iron flows, a refractory material applied to said passage, said refractory material being prepared by adding a thermo-setting resin binder to a mixed material of dolomite clinker, magnesia clinker and a carbonaceous material of 3 mass % or less with respect to 100 mass % of the mixture of the dolomite clinker and magnesia clinker, then kneading, pressure forming and subjecting the mixture to thermal treatment, said mixed material having a ratio WD/WM in the range of 0.5 to 15, wherein WD is a mass % of the dolomite clinker particles having a particle size of 1 mm or less, and WM is a mass % of magnesia clinker particles having a particle size of 1 mm or less, and a ratio W1/W2 being in the range of 0.33 to 3.0, wherein W1 is a content by mass % of a CaO component, and W2 is a content by mass % of MgO, and during casting, as the CaO in the dolomite is consumed by reaction with deposited alumina, MgO in the dolomite clinker and in the magnesia clinker forms an MgO-rich layer, improving corrosion resistance of the refractory applied to the inner passage of the immersion nozzle.

5. The immersion nozzle according to any one of claims 1 to 4, wherein said refractory material is applied by integral pressure-forming with a main body defining the inner passage.

6. The immersion nozzle according to any one of claims 1 to 4, wherein said refractory material is applied by forming refractory material in a form of a sleeve, heat treating, and arranging said sleeve to define said inner passage with a use of magnesia mortar.

7. The immersion nozzle according to claim 1, wherein said refractory material consists of dolomite clinker, magnesia clinker, and thermo-setting resin.

8. The immersion nozzle according to claim 2, wherein said refractory material consists of dolomite clinker, magnesia clinker, thermo-setting resin, and carboneous material.

9. The immersion nozzle according to claim 1, wherein said refractory material consists essentially of dolomite clinker, magnesia clinker, and thermo-setting resin.

10. The immersion nozzle according to claim 2, wherein said refractory material consists essentially of dolomite clinker, magnesia clinker, thermo-setting resin, and carboneous material.

11. The immersion nozzle according to claim 3, wherein WD/WM is 1 to 10.

12. The immersion according to claim 3, wherein WD/WM is 1.5 to 10.

* * * * *